United States Patent

Lee

[11] 4,053,433
[45] Oct. 11, 1977

[54] METHOD OF TAGGING WITH COLOR-CODED MICROPARTICLES

[75] Inventor: Pui Kum Lee, White Bear Lake, Minn.

[73] Assignee: Minnesota Mining and Manufacturing Company, St. Paul, Minn.

[21] Appl. No.: 551,061

[22] Filed: Feb. 19, 1975

[51] Int. Cl.² .......................... C09K 3/00; C10L 1/10; C06B 23/00
[52] U.S. Cl. ........................................ 252/408; 44/51; 44/59; 149/18; 149/19.5; 149/19.91; 149/21; 149/109.4; 428/373; 428/378; 428/381; 428/383; 428/407
[58] Field of Search ................. 252/301.1 R, 301.1 L, 252/408, 62.1 P, 62.53, 62.54, 301.2 R, 301.3 R; 149/21, 18, 2; 44/51, 59; 428/407, 383, 378

[56] References Cited

U.S. PATENT DOCUMENTS

| 2,885,366 | 5/1959 | Iler | 252/301.15 |
| 3,366,573 | 1/1968 | Feuer | 252/301.1 R |
| 3,663,685 | 5/1972 | Evans | 252/301.1 R |
| 3,772,099 | 11/1973 | Ryan et al. | 149/18 |
| 3,772,200 | 11/1973 | Livesay | 252/301.1 R |
| 3,835,782 | 9/1974 | Griffith et al. | 102/27 R |
| 3,861,886 | 1/1975 | Meloy | 44/51 |
| 3,897,284 | 7/1975 | Livesay | 252/301.1 R |

FOREIGN PATENT DOCUMENTS

| 927,492 | 5/1963 | United Kingdom | 252/301.1 R |

*Primary Examiner*—Benjamin R. Padgett
*Assistant Examiner*—T. S. Gron
*Attorney, Agent, or Firm*—Cruzan Alexander; Donald M. Sell; Carolyn A. Bates

[57] ABSTRACT

An improvement in the known method of tagging individual units of production of a substance with microparticles for retrospective identification is disclosed. The improvement comprises the use of microparticles which are encoded with an orderly sequence of visually distinguishable colored segments. Decoding of the microparticles can be accomplished with a microscope or other magnifying device.

18 Claims, 6 Drawing Figures

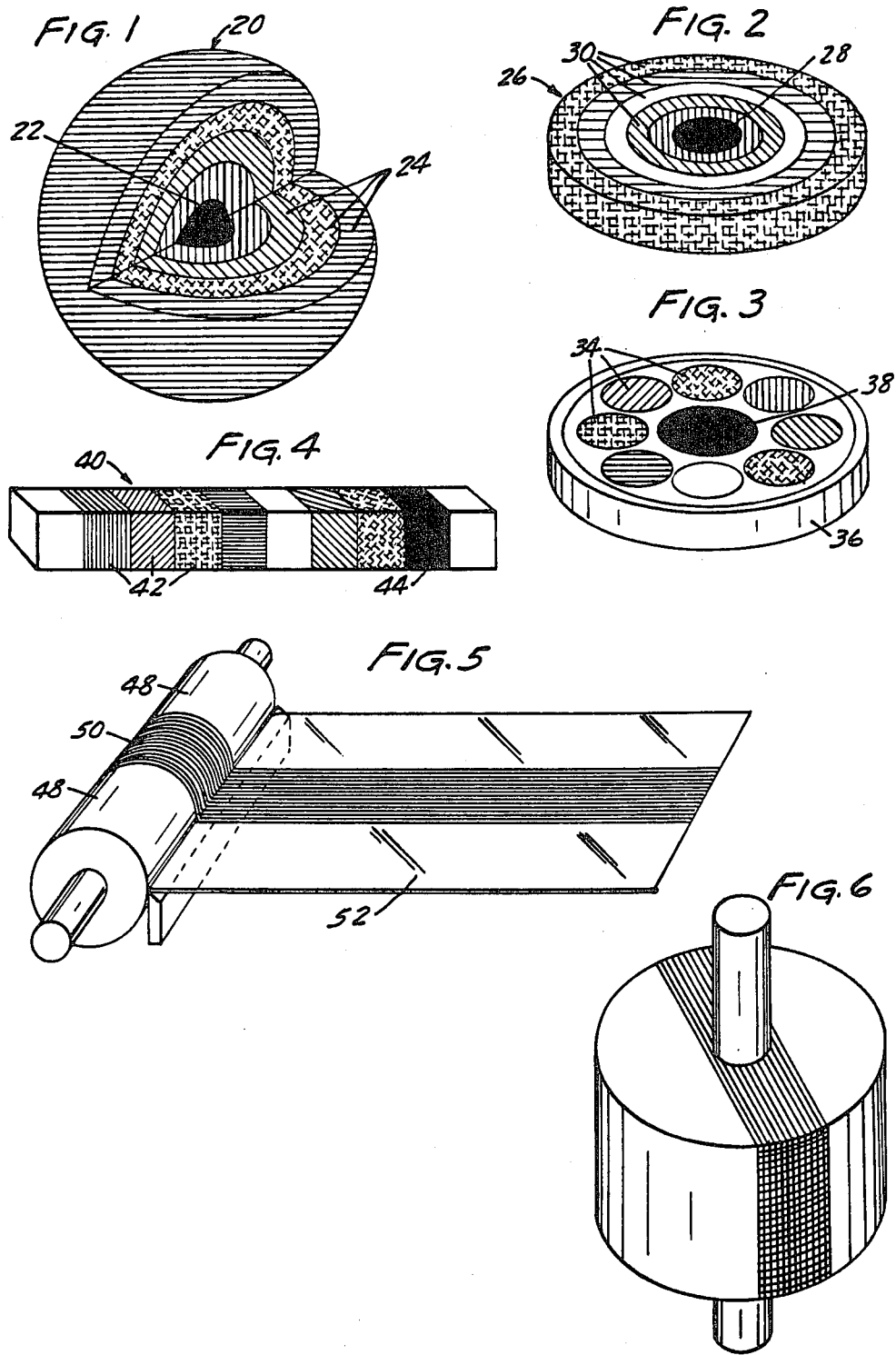

METHOD OF TAGGING WITH COLOR-CODED MICROPARTICLES

BACKGROUND OF THE INVENTION

This invention relates to an improvement in a method of tagging individual units of production of a substance with microparticles for the purpose of retrospective identification of the substance. A further aspect of the invention relates to microparticles useful in retrospective tagging according to the method of the invention.

DISCUSSION OF THE PRIOR ART

Tagging individual units of production of bulk substances with identifying microparticles is known. U.S. Pat. No. 3,861,886 describes a method of tagging bulk material with microparticles having properties different from the properties of particles previously determined to be present in the bulk material. This method of tagging is also described in a printed publication dated May, 1970, entitled "Oil Tagging System Study" by Melpar, an American Standard company, Falls Church, Va. A digest of this publication appears at pages 283-296 of the Publication of the Proceedings of the Joint Conference on Prevention and Control of Oil Spills, sponsored by the American Petroleum Institute and the Federal Water Pollution Control Administration. The following paragraph is common to the above disclosures at page 18 of the Melpar publication and page 291 of the published Proceedings:

Analysis to identify the particles. These tests might include microscopy (for size and shape, color, phosphoresence, fluorescence), microanalysis (for density, hardness, trace analysis), or microspectrometry (light absorption, fluorimetry, reflectance). Microspectrofluorimetry could provide a characteristic spectrograph of just one or of a number of particles; such a trace would, indeed be a "fingerprint."

U.S. Pat. No. 3,772,200 discloses a more specific method of tagging utilizing refractory microparticles containing low levels of elements such as manganese, cobalt, zinc, cadmium, and tin. The combinations of these elements within the microparticle provide the various identifying codes. This method is especially suited for tagging explosives such as dynamite. The microparticles survive detonation and are retrievable from blast debris. A continuation-in-part of this patent, U.S. Pat. No. 3,897,284, describes a similar method of tagging utilizing microparticles of polymeric materials, such as polypropylene, coded with low levels of elements. These microparticles are preferred for tagging dynamite because of their non-sensitizing effect on nitroglycerine.

U.S. patent application Ser. No. 404,625, describes a method of tagging medicaments for retrospective identification. This method utilizes microparticles prepared from physiologically acceptable proteinaceous or polymeric substances containing trace amounts of non-toxic elements in predetermined combinations and concentrations to provide identifying codes. Medicaments having these coded microparticles incorporated therein can be safely administered to humans or animals by oral or parenteral routes.

The above-described methods of tagging substances utilizing microparticles bearing identifying codes are generally useful for purposes of retrospective identification. They provide means of labeling individual units of production of bulk substances with microparticles which are not readily detectable by the user and which do not interfere with the properties of the tagged substances. These methods do suffer from a disadvantage, however, in that they require rather sophisticated decoding procedures. Where selected levels of elements are incorporated into microparticles, deconding is generally accomplished through the use of an electron microprobe analyzer at a location some distance from the retrieval site, necessarily requiring some delay between retrieval of the microparticles and "read-out" of the code.

SUMMARY OF THE INVENTION

The present invention provides retrospective identification by means of microparticles which can be readily decoded by visual inspection of a single microparticle with a microscope or other magnifying means.

The known method of tagging individual units of production of a substance for the purpose of retrospective identification includes the steps of:

1. providing an inventory of batches of microparticles, each batch being uniquely coded;
2. maintaining a record of the unique code employed in each batch; and
3. incorporating microparticles from any one batch with only one unit of production of a substance.

The improvement in this method, according to the present invention, comprises providing microparticles which comprise compilations of, and are encoded according to, a particular orderly sequence of visually color distinguishable dyed and/or pigmented layers of organic materials.

The inventory of microparticles may include up to $[C][C-1]^{n-1}$ uniquely coded batches, where $C$ is the number of available colors and $n$ is the number of segments in the color sequence. For example, using a library of 12 colors in an eight-membered sequence, wherein no color is used adjacent to itself, the number of codes would be determined as follows:

| Segment No. | 1 | 2 | 3 | 4 | 5 | 6 | 7 | 8 |
|---|---|---|---|---|---|---|---|---|
| Colors Available | 12 | 11 | 11 | 11 | 11 | 11 | 11 | 11 |

This system includes 233,846,052 possible codes or one-half that number if the code can be read in either direction. Each color-code should include at least three color segments to provide a desirably large number of codes.

The broadest dimension of a microparticle across the color sequence may be 1 to 1000 micrometers, but upper limits of 250-300 micrometers are preferred in order to provide large numbers of microparticles per unit weight. The preferred microparticles for use in the present invention range from 50 to 250 microns at the broadest dimension across the color sequence. Below 50 microns, the code may be difficult to read, and more sophisticated magnification apparatus may be required.

To facilitate separation from the bulk material into which they are incorporated, it is preferred that the shapes of the microparticles be distinctive. Spherical, cylindrical, polyhedral or other geometrically shaped microparticles are readily recognizable and retrievable from common particulate substances.

DESCRIPTION OF THE DRAWINGS

Understanding of the various types of color-coded microidentifiers and methods of making them will be facilitated by reference to the accompanying drawings wherein:

FIGS. 1–4 are perspective views of different embodiments of color-coded microparticles; and FIGS. 5–6 schematically illustrate the manufacture of the embodiment of FIG. 4.

FIG. 1 shows a spherical type of microparticle 20, referred to herein as the "onion microsphere", wherein a preformed, solid nucleus 22 is present. Colored or dyed layers 24 of polymeric material are concentrically coated upon nucleus 22 in such a way that no adjacent layers are of the same color. Each layer provides one segment of the identifying code. With conventional coating techniques the average thickness of each layer is approximately 25 micrometers.

After retrieval of the onion microsphere from the tagged substrate, it is cut in half or a pie-shaped section cut out, and the color code read from the resulting cross-section. It is customary to designate a single color to be consistently used to form the outer layer of the microparticle. This assures that a microparticle bearing a complete code will be read. When the outer layer is an "indicator" segment it is not read as part of the code.

Choice of core material for the onion microspheres will depend, in part, on the material to be tagged and its ultimate use. In addition to the ability to survive further processing of the tagged material, the core material should be suitably small in size, readily sectioned, and capable of forming a strong bond with the surrounding pigmented layer. Suitable core materials for most purposes include plastics such as polyolefins and polyacrylates, waxes, glass bubbles, and biodegradable macromolecules such as albumin, gum arabic, gelatin, and polyvinylpyrrolidone. For descriptions relating to the preparation of microspheres from a variety of substances in a size range preferably 50 to 200 micrometers in diameter, suitable for use as core materials in the onion microspheres, see U.S. Pat. Nos. 3,772,200 and 3,663,685.

The nucleus of the microparticle may be any monofilament, nylon, which has a diameter sufficiently small to meet the prescribed size requirements, preferably 25 to 200 micrometers. Concentric colored layers are built up around the monofilament nucleus and the resulting microparticle may be used as a retrospective identifier even though it may be several millimeters in length. Alternatively, the coated monofilament may be cut into short lengths to form the microparticle shown in FIG. 2, referred to herein as the "microdisc." Microdisc 26 contains a monofilament nucleus 28, and colored layers 30 are concentrically coated thereon in such a way that no two adjacent layers are the same color.

The dyes and pigments used to form the colored layers or segments of the onion microsphere or the microdisc are conventional items well known to those skilled in the art, and include, for example, inorganic pigments such as sulfates, chromates, sulfides, oxides, carbonates, etc., and stable organic pigments such as phthalocyanine and Hansa Yellow. A list of suitable colors may include:

Clear, Red, Blue, Black, Orange, Violet, Brown, Yellow, Fluorescent Red, White, Green, Fluorescent Green.

An extensive list of dyes and pigments is found in Color Index, 3rd Ed., Edited by F. M. Rowe, published by the Society of Dyers and Colorists, Yorkshire, United Kingdom.

The main requirements of the colored layers include (1) the ability to bond to the core material and each other so that the integrity of the microparticle is maintained and (2) the absence of "color strike" or bleeding between layers. The colored layers are generally applied as a liquid resin systems including dye or pigment. An alternative method is to apply successive colored layers of non-solvent compatible resins. For example, one layer may consist of a ketone-soluble resin with the adjacent layer being a non-ketone soluble resin. Alternating resin layers in this manner eliminates the need for each layer to harden before the next layer is applied. Examples of resin systems in which dyes and pigments can be incorporated to form the colored layers include cellulosic derivatives, epoxy compounds, polyolefins and waxes. The most preferred materials are polyacrylics.

The concentric colored layers are applied to the core material by conventional processes including fluid or spouting bed, ball mill, dipping, or pharmaceutical pill coating processes. A presently preferred method for applying the colored layers to spherical particles is through the use of a Wurster coater described in U.S. Pat. No. 3,241,520. The color resin may be dissolved or dispersed in a fugitive solvent, or if the pigment exists in a liquid system of low viscosity, it may be applied without the need for a solvent.

The color coded microparticle illustrated by FIG. 3, referred to herein as the "microrosette", may be made by placing monofilaments 34 of different colors and preferably 5 to 50 micrometers in diameter, in an ordered arrangement inside a heat shrinkable sheath 36 formed from, for example, heat shrinkable plasticized polyvinyl chloride, around a center monofilament core 38. Heat is applied, and the sheath is drawn down to a smaller diameter. The colored monofilaments are retained in their ordered arrangement during drawn-down and form a ring around the central core. The sheath may then be sectioned to form microrosettes of the desired length. If longer sections are incorporated into a substance for retrospective identification, cross-sectioning may be necessary in order to read the color coded segments provided by the filaments surrounding the core. One of those filaments may be of a preselected color such as black or clear as a starting point.

Materials useful in making microrosettes include colored monofilaments of polyamides, polyesters, polyolefins, polyacrylics, and modified celluloses.

A preferred type of color-coded microparticle for use in practicing the invention consists of microscopic pieces of colored plastic films fused together to form a rectangular "microsandwich" as shown in FIG. 4. The microsandwich 40 is a generally rectangular hexahedron which has ten color segments 42 in sequence, with no segments of the same color being adjacent to one another. The code may be read from left to right or right to left. However, a key segment 44 of a specified color such as black may be built into the sequence to designate the direction in which the code is to read. End segments are generally clear or a designated color in order to readily determine whether a complete or partial microsandwich has been retrieved. The outer "indicator" segments are not read as part of the code.

The microsandwich identifiers may be prepared by a double skiving technique as follows. Individual colored plastic films of polyethylene or other solvent-resistant plastic are stacked in the particular color sequence of the desired identifying code. The thickness of each film is generally between 12 and 200 micrometers. The outer-facing surface of each of the top and bottom films of the stack is coated with a release material which may be any resin material which is heat fusable with the plastic film and soluble in a solvent which will not attack the plastic film. Suitable release materials include polystyrene, polyvinyl alcohol, and the preferred material is Union Carbide VAGH vinyl polymer (a mixture of about 91% vinylchloride, 3% vinyl acetate and 6% other ingredients) which is soluble in methylethyl ketone.

Discs having a center hole are cut from the film stack. These colored discs are stacked on a mandrel with a large number of clear discs of the solvent resistant plastic above and below the colored discs. This lay-up is heated (e.g. 120°–125° C for two hours in the case of polyethylene film) to fuse the film layers and the release material into a billet. This billet is then skived to produce a ribbon 52 as illustrated in FIG. 5.

The billet consists of clear plastic layers 48 fused to colored layer 50. Colored layer 50 is normally made up of a multiplicity of code sequences separated from each other and from the clear layers by release material.

Release material is coated onto both sides of ribbon 52. Discs having a center hole are cut from the coated ribbon and stacked on a mandrel as shown in FIG. 6. The lay-up is heated to fuse the discs into a billet, which is skived in the manner shown in FIG. 5 to produce a ribbon having repeating clear and colored areas. This ribbon is soaked in a solvent which will selectively dissolve the release material, thus generating the individual microsandwiches.

The overall dimensions of the microsandwiches will be determined by the thickness of the colored films used and the thickness of the ribbons which can be cut with the skiving device. For general description of the skiving technique used, see U.S. Pat. No. Re. 27,617. For most materials, heating is not required during the skiving process. Generally skiving to produce a ribbon about 12.5 micrometers thick is adequate. Thus, by using plastic film about 65 micrometers thick and skiving to form ribbons about 12.5 micrometers thick a microsandwich having individual segments approximately 65 × 12.5 × 12.5 micrometers can be manufactured. The overall length of the sandwich will, of course, depend on the number of segments present. It is preferred that the microsandwich contain at least three segments constituting the color code with an indicator segment at each end.

The selection of materials comprising the microparticles depends upon the properties of the substance into which they are to be incorporated. In certain cases microparticles must be "tailor made" to fit the individual requirements of the substance to be tagged. Survival of the microparticles after further processing of the substance is of primary concern.

The method of the present invention is particularly well suited for the tagging of bulk materials such as grains and chemicals, animal and fowl feeds, and orally-administered drugs for human and veterinary use. Liquid products such as non-opaque lacquers and resins, can be tagged with low concentrations of microparticles. Microsandwich identifiers have been incorporated into dynamite and successfully retrieved from blast debris following detonation. Microsandwiches have also been used to tag paper and other solid products such as concrete.

The color coded microparticles should be homogeneously incorporated into the substance to be tagged, preferably in an amount ranging from 0.0001 to 1.0 part by weight for every 100 parts by weight of bulk material. To facilitate homogeneous distribution, the microparticles should be tack-free at room temperature. To known whether bulk material has been subsequently diluted, careful control of convention of the microparticles is necessary.

Retrieval of the microidentifiers from the manufactured product can be accomplished in a number of ways, depending upon the type of microparticle used and the nature of the material tagged. With bulk materials in powder form, separation can generally be accomplished by visual means. The microparticles, because of their characteristic shape and color, can be distinguished readily under magnification. A fluorescent color in the code may aid in retrieval of the microparticle.

With some bulk materials it may be more convenient to separate the microparticles by their density characteristics in a liquid. For example, microsandwiches of polyethylene have been retrieved from debris collected at the site of an explosion by adding the debris to a 1.2 specific gravity $ZnCl_2$ solution. The microsandwiches will float in the $ZnCl_2$ solution and can be easily isolated.

To facilitate the retrieval of the microparticles, it is preferred, in most cases, to incorporate magnetic iron oxide pigments or iron powder into the microparticle. Microparticles can then be magnetically separated from surrounding material. This method is particularly useful in separating microparticles from the blast debris.

When making microsandwiches from extruded polyethylene film, difficulty was encountered in extruding resin which had a high (about 30% by weight) magnetic iron oxide content. It was found that by using iron powder (essentially spherical) dispersed in small amounts (i.e. about 12 to 30%) in the polyethylene, extrusion problems were eliminated. The iron powder did not mask the color of the film and the resulting microidentifiers were retrievable with a magnet.

When using a magnet to retrieve microidentifiers from bulk material, it is convenient to place the magnet on the inside of an open plastic bag. The particles will adhere to the outer surface of the bag, and the bag can be turned inside-out to trap the microparticles.

The following nonlimiting examples in which parts are given by weight, will further illustrate the color-coded microparticles useful in the practice of the invention:

EXAMPLE 1

A bundle of red, green, amber and blue polypropylene monofilaments, each having a diameter of about 600 micrometers, were assembled in a preselected color sequence around a center monofilament core within a sheath of heat shrinkable plasticized polyvinyl chloride tubing about 30 cm long and 3200 micrometers in diameter with a wall thickness of 400 micrometers. While under tension the sheathed filament bundle was subjected to a blast of hot air and the sheath drawn down to a diameter of about 1600 micrometers. The result was fused bundle of filaments fixed within a matrix of polyvinyl chloride tubing. Sections about 400 micrometers in length were cut from the fused bundle. Microscopic examination of these "microrosettes" revealed individual colored filaments, fixed in an orderly sequence around a center core. In order to be more useful the fused bundle should be drawn down to a diameter less then 1000 micrometers.

EXAMPLE 2

Microporous polymeric ion exchange resin beads (Amberlite No. A-26, a quaternary form of a polystyrene resin available from Mallinckrodt Company) about 500–750 micrometers in diameter were used as nuclei for spherical color coded microparticles, i.e., "onion microspheres."

Coating solutions were made by mixing 0.5 parts of General Mills "Versamid" 125, a polyamide resin with an amine value of 290–300, with 5 parts of Shell Chemical Company "Epon" 828, a bisphenol A epoxy with an epoxide equivalent of 190. To the polymeric mixture were added five parts methylethyl ketone and two parts of chrome yellow pigment. A similar coating mixture was prepared using red lead (97% grade) pigment.

Two parts of the yellow colored resin-pigment mixture were added to 25 parts of the ion exchange resin beads in a tumbler, and tumble-mixed until tacky. Two parts of dry yellow pigment were added with continued tumble-mixng until the tacky surface of each bead was well coated with the dry pigment. The yellow pigment-coated beads were dried at 88° C for ½ hour to gel the resin coating. The unused pigment was screened from the coated beads.

The same process was repeated with the red resin-pigment mixture and the yellow until four coats had been placed on the beads. The lot of color beads was sized by screening through No. 18, 20 and 25 American Standard screens (1000, 841 and 707 micrometer openings, respectively) to remove agglomerates of beads and dry pigment residues.

Microscopic examination of a sectioned bead revealed a sequence of four coatings, each about five micrometers thick.

EXAMPLE 3

Microdisc identifiers were prepared by applying concentric coatings to a nylon monofilament using the coating technique of Example 2. The nucleus monofilament having a diameter of 25 micrometers was passed through a series of resin-pigment coating solutions. The color sequence used was yellow, red, white and black (chrome yellow, red lead, titanium dioxide and lamp black). Between each coating bath, the monofilament was passed through a 100° C forced air drier which evaporated the solvent and gelled the epoxy resin sufficiently to prevent color bleeding.

After the fourth color coat had been applied and dried to provide an overall diameter of about 60 micrometers, the coated monofilament was passed through a high speed microtome to produce microdiscs about 50 micrometers in thickness.

When a relatively large monofilament, about 25 micrometers in diameter, is used as a nucleus, heat and tension may be applied to the monofilament after the colored layers have been applied to permit reduction in the diameter of the coated monofilament. When coating a monofilament and drawing it down to a smaller diameter, the same polymeric material should be used for both the nucleus and the coating so that all parts of the coated monofilament are matched in stretch characteristics. The individual coatings should be thinly applied and flash dried to prevent bleeding between color coats. When color coats of five micrometers or less are applied, a dark color may show a light color overcoat. However, since the code is read from a cross section, thin coat transparency is not a problem.

EXAMPLE 4

This example illustrates the preparation of microsandwich microparticles using the double skiving technique.

Colored polyethylene films each having a thickness of 65 micrometers were stacked in a selected color sequence, e.g., blue, red, green, yellow and purple. The outer surface of the two outside films of the stack had been corona-treated and subsequently coated with a release material consisting of 10 parts by weight of Union Carbide vinyl resin VAGH, 10 parts by weight of ethyl alcohol and 30 parts by weight of methyl ethyl ketone (MEK).

The film stack was punched into discs having a diameter of about 15 cm with a center hole about 6 cm in diameter. The discs were stacked on a mandrel against a butt plate to a height of about 3.8 cm, which represented about 40 repeating color-codes. Clear polyethylene discs were stacked on both sides of the colored discs to provide an overall lay-up of about 15 cm.

This lay-up was heated to 120°–125° C for two hours to achieve fusion of the layers and form a plastic billet.

The billet was skived as shown in FIG. 5 to form a ribbon approximately 125 micrometers thick. The VAGH vinyl separation coat was applied to both the upper and lower surfaces of the ribbon. Discs approximately 15 cm in diameter having center holes of about 6 cm were cut from the ribbon. The discs were stacked on a mandrel to a height of about 15 cm. The lay-up was heated for two hours 120°–125° C to fuse the layers and form a plastic billet as shown in FIG. 6.

The billet was skived to produce a ribbon approximately 125 micrometers thick. By washing this ribbon in MEK, the VAGH release layer was dissolved, generating the individual microsandwiches which were air dried.

The microsandwiches can be made magnetic by incorporating iron powder into the resin mixture prior to extruding the colored films. Concentrations of iron powder up to a maximum of about 30 percent by weight may be added to the resin without affecting the color of the film. If iron powder is added to each layer, a concentration of about 12 percent by weight is sufficient to make the particles readily retrievable by a magnet.

What is claimed is:

1. In a method of tagging individual units of production of a substance with microparticles for the purpose of retrospective identification including the steps of: (1) providing an inventory of batches of microparticles, each batch being uniquely coded, (2) maintaining a record of the unique code employed in each batch and (3) incorporating microparticles from any one batch with only one unit of production of a substance, the improvement comprising the use of microparticles which comprise compilations of, and are encoded according to, a particular orderly sequence of visually color distinguishable dyed and/or pigmented layers of organic materials, each said microparticle being 1 to 1000 micrometers at its broadest dimension across the color sequence, which inventory includes up to $(C)(C-1)^{n-1}$ uniquely coded batches of microparticles where C is the number of available colors and $n$ is the number of layers in the sequence.

2. Method of tagging according to claim 1 wherein said microparticles are incorporated into said substance in a concentration of 0.0001 to 1 part by weight for every 100 parts by weight of the substance.

3. Method of tagging according to claim 1 wherein each said microparticle is 50 to 1000 micrometers at its broadest dimension across the color sequence.

4. Method of tagging according to claim 2 wherein said microparticles comprise up to 30 percent by weight of a magnetic substance which permits retrieval of said microparticles with a magnet.

5. Method of tagging according to claim 3 wherein each microparticle comprises a solid nucleus having coated thereon concentric layers of said visually color distinguishable organic material, with no two adjacent layers of the same color.

6. Method of tagging according to claim 5 wherein said layers are formed from pigmented polymeric material.

7. Method according to claim 6 wherein the layers are formed from pigmented mixtures of polyamide and epoxy resins.

8. Method of tagging according to claim 5 wherein said nuclei are essentially spherical particles between 50 and 200 micrometers in diameter.

9. Method of tagging according to claim 5 wherein said nuclei are monofilaments 25 to 200 micrometers in diameter.

10. Method of tagging according to claim 9 wherein the monofilaments are polyolefin monofilaments.

11. Method of tagging according to claim 3 wherein each of said microparticles is a generally rectangular hexahedron and said sequence is provided by a series of layers generally parallel to one face.

12. Method of tagging according to claim 11 wherein said microparticles are formed from colored polyethylene films.

13. A plurality of batches of microparticles to be used for tagging individual units of production of a substance to permit retrospective identification of those units the microparticles each batch comprise compilations of, and are uniformly and uniquely encoded according to, a particular orderly sequence of visually color distinguishable dyed and/or pigmented layers of organic materials, there being at least three colored layers in the sequence, and each microparticle being 1 to 1000 micrometers in its broadest dimension across the color sequence.

14. A plurality of batches of microparticles according to claim 13 wherein each of said microparticles comprise a solid nucleus having coated thereon concentric layers of said visually color distinguishable organic materials which in section provide said sequence.

15. A plurality of batches of microparticles according to claim 14 wherein said nucleus is essentially spherical.

16. A plurality of batches of microparticles according to claim 14 wherein said nucleus is a monofilament.

17. A plurality of batches of microparticles according to claim 13 wherein each of said microparticles is a generally rectangular hexahedron and said sequence is provided by a series of layers generally parallel to one face.

18. A plurality of batches of microparticles according to claim 13 wherein each of said microparticles comprises up to 30 percent by weight of a magnetic substance which permits retrieval of said microparticles with a magnet.

* * * * *

UNITED STATES PATENT AND TRADEMARK OFFICE
CERTIFICATE OF CORRECTION

PATENT NO. : 4,053,433
DATED : October 11, 1977
INVENTOR(S) : PUI KUM LEE

It is certified that error appears in the above—identified patent and that said Letters Patent are hereby corrected as shown below:

Col. 8, line 1, insert -- through -- after "show."

Col. 9 line 6, claim 4, change "claim 2" to -- claim 3 --.

Signed and Sealed this

Fourth Day of April 1978

[SEAL]

Attest:

RUTH C. MASON
Attesting Officer

LUTRELLE F. PARKER
Acting Commissioner of Patents and Trademarks